Jan. 10, 1956
C. F. BRITTON
2,730,199
BRAKE ADJUSTOR
Filed Sept. 29, 1954
2 Sheets-Sheet 1
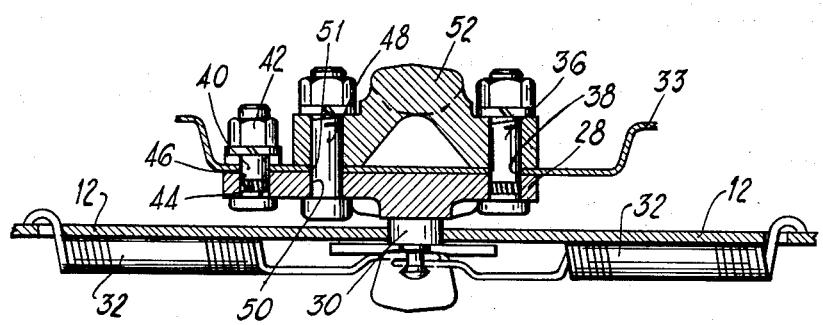
INVENTOR.
CLAYTON F. BRITTON
BY
John A. Young
ATTORNEY Jan. 10, 1956   C. F. BRITTON   2,730,199
BRAKE ADJUSTOR
Filed Sept. 29, 1954   2 Sheets-Sheet 2
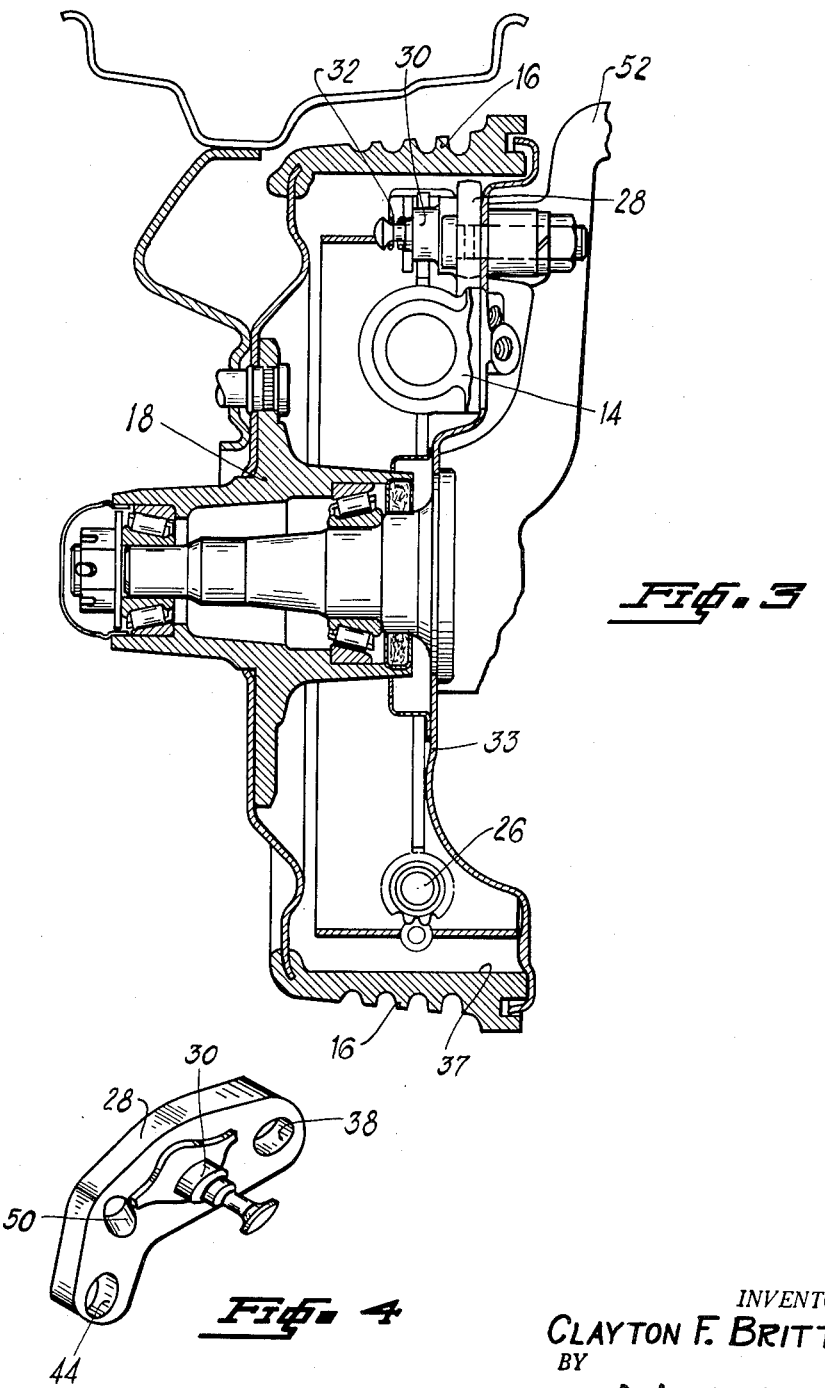
INVENTOR.
CLAYTON F. BRITTON
BY
John A. Young
ATTORNEY

United States Patent Office 2,730,199
Patented Jan. 10, 1956

2,730,199

BRAKE ADJUSTOR

Clayton F. Britton, South Bend, Ind., assignor to Bendix Aviation Corporation, South Bend, Ind., a corporation of Delaware Application September 29, 1954, Serial No. 459,097

6 Claims. (Cl. 188—78)

This invention relates to a brake adjustor and more particularly to an adjustor for a pair of internally expanding brake shoes.

An object of the invention is to provide manual adjustment of the brake shoes by pivotally moving an anchoring bracket which vertically suspends the shoe ring.

Another object of the invention is to obtain a "preset" position for the brake shoes by means of an adjustable anchor, thus simplifying installation of the brake onto the vehicle.

A further object of this invention is to utilize the devices which fasten the anchor bracket as means for attaching the brake to the vehicle.

An additional object of the invention is to compensate for cumulative manufacturing tolerances to obtain a preferred clearance of the brake shoes from an applied position.

Along with these foregoing objects it has been my object to provide an adjustor which is readily accessible and capable of rendering a refined degree of adjustment of the brake shoes.

The above and other objects and features of the invention will appear more fully hereinafter from a consideration of the following description, taken in connection with the accompanying drawings wherein one embodiment of the invention is illustrated by way of example.

In the drawings:

Figure 1 is a side elevation of a brake assembly incorporating the invention;

Figures 2 and 3 are section views taken on lines 2—2 and 3—3 respectively of Figure 1; and Figure 4 is an isometric view of the anchor bracket.

The friction producing elements of the brake consist of a pair of articulated primary and secondary brake shoes 10 and 12 which are applied by a fluid motor 14 against a drum 16. The drum 16 is secured to a rotatable part of the vehicle, as for example, hub 18.

Each of the brake shoes consists of a web 20 and rim 22 having friction material lining 24. The shoes are connected at one end by an adjustable link 26 which is manually operated to spread the articulated ends of the shoes apart, thus compensating for wear of the lining.

The brake shoes are suspended vertically by an anchoring bracket 28. The expansible ends of the shoes contact a laterally extending projection 30 which forms a boss on the anchoring bracket 28. The projection 30 defines the retracted position for the expansible ends of the shoes when the brake is released. Return springs 32 are fastened between each of the shoes and the projection 30 to retain the expansible shoe ends in released position.

The brake shoes form a shoe ring which anchors on either of the expansible ends thereof, depending upon the direction of drum rotation to be impeded.

The shoe ring is positioned laterally by a backing plate 33. Holddown devices 34 are utilized to urge the shoe ring against positioning ledges 35 formed on the backing plate.

This invention is primarily concerned with positioning the shoes with respect to the cylindrical surface 37 of the drum. The proper position of the shoe ring is approximately concentric with the cylindrical drum surface 37. Properly locating the shoe ring can become particularly difficult because of cumulative manufacturing tolerances. The brake is shipped to the automobile manufacturer without the drum, which is separately installed on the vehicle. Since the drum and shoe ring are not matched during manufacture it is necessary that both be constructed for universal interchangeability. To avoid installation difficulties, the shoe ring is preset by reference to a standard sized drum. This presetting operation is accomplished by means of the adjustable anchor bracket 28 and link 26.

The anchor bracket 28 is pivotally mounted on backing plate 33 by means of a bolt 36 which is received through two congruent openings 38 formed in the bracket 28 and the backing plate 33. The bolt 36 is rigidly fastened to the anchor bracket by a press fitting operation or the like.

A second bolt 40 is press fitted in the opposite end of the anchoring bracket 28. When nut 42 on bolt 40 is tightened down this restrains pivotal movement of the bracket causing turning of the bolt 36 in the opening 38 in the support member. As best seen in Figures 1 and 4, the bolt 40 is received through a circular opening 44 in the anchoring bracket 28 and an oblong slot 46 in the backing plate. The circular opening 44 fits over the oblong slot 46 so that sliding of the bolt 40 within the slot 46 is permitted when the bracket is caused to pivot.

A third bolt 48 is located between the projection 30 and the bolt 40. The third bolt 48 is received through an oblong slot 50 (see Figure 4) in the bracket 28 and a circular opening 51 in the backing plate 33. The through bolt 48 is provided with running fit in the backing plate 33 just as is bolt 36. The anchoring bracket is permitted to pivot in opening 38 in the backing plate 33 since the sides of the oblong slot 50 in the bracket can slide over the bolt 48.

The brake is attached to some appropriate part of the vehicle, as for example, the knuckle 52 by means of the bolts 36 and 48. It will be noted that braking torque is transmitted to the vehicle through the anchoring bracket and bolts in a manner by-passing the backing plate 33.

The bolts 36 and 48 are utilized for a plurality of functions; they position the anchoring bracket in the brake assembly, permit pivotal movement of the anchoring bracket, and attach the brake to the vehicle.

Once the brake is assembled it is then preset in the following manner:

The brake assembly is fitted within a standard drum and the adjustor 26 is extended to contact lining 24 with the cylindrical surface of the drum. The adjustor is then back off a predetermined amount and then the entire shoe ring is located vertically. The vertical locating step is accomplished by loosening nut 42 and tapping the nut 42 to force the shoe ring either up or down by pivoting the bracket 28. The bolt 36 is caused to turn in the opening 38 in the support member. The bolt 36 is rigidly fixed to the bracket and is journalled in the opening 38 to locate the center for pivotal movement of the bracket. The shoe ring, being suspended on the projection 30 is responsive to pivoting of the bracket by moving in either vertical direction. Following positioning of the shoe ring vertically the nut 42 is tightened down and the shoe ring is maintained in this adjusted position; the nut 42 prevents further pivoting of the bracket 28 in either direction and hence a vertical position for the shoe ring is established. The brake assembly is shipped in this condition to the automobile assembler who then attaches the brake to the vehicle by bolts 48 and 36.

Because the shoe assembly is already adjusted, there is an appreciable saving of time and cost in fitting the brakes and drum onto the vehicle. It has been my experience that with the presetting operation, only one brake in each hundred necessitates any further adjustment when the brake is fitted onto the vehicle.

It is to be understood that the principles of my adjustable anchor bracket are utilizable not only for presetting the brake but are also employed when any manual adjustment of the link 26 is made to take up clearance of the brake because of lining wear. Also, replacement shoes can be adjusted without use of any special tools.

Although this invention has been described in connection with a certain specific embodiment, the principles involved are susceptible of numerous applications and modifications that will readily occur to persons skilled in the art.

I claim:

1. In a brake, a shoe ring consisting of a pair of articulated T-section brake shoes having adjacent expansible ends, a backing plate arranged to laterally guide said shoe ring, an anchor bracket in juxtaposition with said backing plate, a projection extending laterally from said anchor bracket with the expansible ends of said shoes being arranged to anchor thereagainst, said shoe ring being vertically suspended by said projection, means fastened between said shoes and projections for maintaining the shoe ends in released position against said projection, a fluid motor located radially inwardly from said anchor bracket and operatively connected to the expansible ends of said shoes, means pivotally securing said bracket to the backing plate whereby vertical position of the shoe ring is determined from pivotal movement of said bracket, fastening means received through registrable openings in said bracket and backing plate to retain the bracket and shoe ring in a selected vertical position and means received through registrable openings in said backing plate and bracket and located intermediate the pivotal point for the bracket and said fastening means, said pivotal means and said last mentioned means being extended for attaching the brake to a part of the vehicle.

2. In a brake, a primary brake shoe and a secondary brake shoe, an adjustable link interconnecting one pair of adjacent shoe ends, a supporting plate for laterally guiding said shoes, a fluid motor operatively connected to adjacent expansible ends of the brake shoes, an anchor bracket, a projection extending laterally from said bracket with the expansible ends of the shoes bearing thereagainst, resilient means fastened between the brake shoes and projection for maintaining the shoe ends against said projection when the brake is released, said brake shoes being vertically suspended by association with said projection, means pivotally securing said bracket to the support plate whereby pivoting of the bracket will adjust the brake shoes vertically, means received through registrable openings in the bracket and supporting plate to hold the bracket against pivotal movement for retaining the shoes in a selected vertical position, and means received through registrable openings in the supporting plate, the pivotally securing means and said last mentioned means extending into contact with a part of the vehicle to attach the brake thereto.

3. In a brake, a pair of articulated brake shoes, a backing plate, anchoring means vertically suspending the brake shoes, said anchoring means being pivotally secured to the backing plate, a fastening device received through apertures in the anchoring means and backing plate to permit pivotal movement of the anchoring means, said fastening device being adapted to hold the anchoring means against pivotal movement to maintain a selected vertical position for the brake shoes, and a second fastening device received through the anchoring means and backing plate for attaching the brake to the vehicle.

4. An adjustable anchoring means for a pair of articulated brake shoes suspended thereby, said anchoring means consisting of a flat underside lying contiguously to the brake, a projection extending from a portion of said anchoring means, one of the ends of said anchoring means being adapted for pivotally mounting the anchoring means, the opposite end of said anchoring means being adapted to receive a fastening device resisting pivotal movement of the anchoring means and means adjacent said projection for attaching the anchoring means to a vehicle.

5. In a brake having a pair of brake shoes with adjacent expansible ends, a backing plate arranged to laterally guide said shoes, an anchor bracket in juxtaposition with said backing plate, a projection extending laterally from said anchor bracket with the expansible ends of said shoes being arranged to anchor thereagainst, said shoes being vertically supported by said projection, means fastened between said shoes and projection for maintaining the shoe ends in released position against said projection, means pivotally securing said bracket ot the backing plate whereby vertical position of the shoes is determined from pivotal movement of said bracket, fastening means received through registrable openings in said bracket and backing plate to retain the bracket and shoes in a selected vertical position, and means received through openings in said backing plate and bracket and located intermediate the pivotal point for the bracket and said fastening means to secure the bracket to a fixed part of the vehicle.

6. In a brake having a support plate, an anchor bracket, a projection extending laterally from said bracket with the adjacent expansible ends of brake shoes bearing thereagainst, resilient means fastened between the brake shoes and projection for maintaining the shoe ends against said projection when the brake is released, said brake shoes being at least partially vertically supported by association with said projection, means pivotally securing said bracket to a support plate whereby pivoting of the bracket will adjust the brake shoes vertically, and means received through registrable openings in the bracket and supporting plate to hold the bracket against pivotal movement for retaining the shoes in a selected vertical position.

No references cited.